(12) United States Patent
Naito et al.

(10) Patent No.: US 11,530,142 B2
(45) Date of Patent: Dec. 20, 2022

(54) WATER TREATMENT APPARATUS

(71) Applicant: Mitsubishi Electric Corporation, Chiyoda-ku (JP)

(72) Inventors: Teruki Naito, Chiyoda-ku (JP); Gaku Oinuma, Chiyoda-ku (JP); Yu Kamiya, Chiyoda-ku (JP); Yasutaka Inanaga, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 67 days.

(21) Appl. No.: 16/965,113

(22) PCT Filed: Mar. 14, 2018

(86) PCT No.: PCT/JP2018/009862
§ 371 (c)(1),
(2) Date: Jul. 27, 2020

(87) PCT Pub. No.: WO2019/175997
PCT Pub. Date: Sep. 19, 2019

(65) Prior Publication Data
US 2020/0361794 A1 Nov. 19, 2020

(51) Int. Cl.
*C02F 1/46* (2006.01)
*C01B 13/11* (2006.01)
(Continued)

(52) U.S. Cl.
CPC .......... *C02F 1/4608* (2013.01); *C01B 13/115* (2013.01); *C02F 1/006* (2013.01);
(Continued)

(58) Field of Classification Search
CPC ...... C02F 1/48; C02F 1/00; C02F 1/46; C02F 1/72; C02F 1/78; C01B 12/115
See application file for complete search history.

(56) References Cited

U.S. PATENT DOCUMENTS

2011/0240539 A1 10/2011 Nose et al.
2017/0369341 A1* 12/2017 Oinuma ................ C01B 15/029

FOREIGN PATENT DOCUMENTS

| JP | 51-122950 | 10/1976 |
|---|---|---|
| JP | 2011-16118 A | 1/2011 |
| RU | 2 178 774 C2 | 1/2002 |

OTHER PUBLICATIONS

International Search Report dated May 15, 2018 in PCT/JP2018/009862 filed on Mar. 14, 2018, 2 pages.
(Continued)

*Primary Examiner* — Cameron J Allen
(74) *Attorney, Agent, or Firm* — Xsensus LLP

(57) ABSTRACT

A water treatment apparatus includes: a plurality of plate-shaped ground electrodes; a high-voltage electrode unit having counter electrode portions opposing the ground electrodes, support portions supporting the counter electrode portions, and a voltage receiving portion for receiving a high voltage; a water supply unit for supplying to-be-treated water to between the ground electrodes from above, insulating members each having a lower end portion fixed to a support structure fixing lower end portions of the ground electrodes, and an upper end portion connected to the voltage receiving portion of the high-voltage electrode unit. The lower ends of the support portions of the high-voltage electrode unit are held in a space between the ground electrodes, and a portion where each insulating member and the high-voltage electrode unit are connected to each other is located above the water supply unit, so that electric leak due to the to-be-treated water is inhibited.

19 Claims, 8 Drawing Sheets

(51) Int. Cl.
*C02F 1/00* (2006.01)
*C02F 1/48* (2006.01)
*C02F 1/72* (2006.01)
*C02F 1/78* (2006.01)
*C02F 101/30* (2006.01)

(52) U.S. Cl.
CPC ............... *C02F 1/48* (2013.01); *C02F 1/722* (2013.01); *C02F 1/78* (2013.01); *C02F 2101/30* (2013.01); *C02F 2305/023* (2013.01)

(56) References Cited

OTHER PUBLICATIONS

Chinese Office Action dated Feb. 8, 2022 in Chinese Patent Application No. 201880090883.6.
Office Action issued Jul. 4, 2022 in Chinese Patent Application No. 201880090883.6, 14 pages.

\* cited by examiner

WATER TREATMENT APPARATUS

TECHNICAL FIELD

The present disclosure relates to a water treatment apparatus for purifying to-be-treated water using electric discharge.

BACKGROUND ART

Industrial waste water, recycled water, and the like may contain hardly-decomposable substances that cannot be decomposed by ozone ($O_3$) or chlorine. In particular, removal of dioxins, dioxane, and the like is a big issue. In some sites, a method has been put into practical use, in which ozone and hydrogen peroxide ($H_2O_2$) or ultraviolet rays are combined to generate hydroxyl (OH) radicals having higher activity than ozone and chlorine, in to-be-treated water, thereby removing hardly-decomposable substances. However, the apparatus cost and the operating cost for this method are very high, and thus this method has not been popularized to a large extent. Therefore, a method in which hardly-decomposable substances are removed with high efficiency by causing OH radicals generated by electric discharge to act directly on to-be-treated water, has been considered.

As a water treatment apparatus that performs such water treatment, a water treatment apparatus that makes to-be-treated water into a mist form and performs treatment on the to-be-treated water in a discharge space has been known (for example, Patent Document 1 and Patent Document 2).

Patent Document 1 indicates that linear electrodes are arranged in a tubular container at regular intervals so as to be suspended from above, plate-shaped electrodes are arranged at regular intervals so as to be parallel to the linear electrodes, a high-voltage DC voltage is applied between both electrodes, and the to-be-treated water is sprinkled from above the container, and water treatment is performed by generated ozone.

Patent Document 2 discloses a water treatment apparatus in which a cylindrical ground electrode is provided in a treatment tank, linear high-voltage electrodes are provided along the central axis of the ground electrode via insulators provided at both ends of the ground electrode, and to-be-treated water is made into a mist form and supplied to the interior of the circular ground electrode. In the water treatment apparatus, electric discharge is generated by applying a high-voltage pulse between the ground electrode and the high-voltage electrodes, and active species such as radicals generated by the electric discharge are caused to efficiently act on the to-be-treated water. Thus, it is possible to provide a water treatment apparatus that has an improved treatment speed and decomposes a large amount of to-be-treated water in a short time and that is compact and easy in maintenance.

CITATION LIST

Patent Document

Patent Document 1: Japanese Laid-Open Patent Publication No. 51-122950 (claims, drawings)
Patent Document 2: Japanese Laid-Open Patent Publication No. 2011-16118 (see FIGS. 3 to 5)

SUMMARY OF THE INVENTION

Problems to be Solved by the Invention

In general, to-be-treated water that is the target of water treatment contains alkali ions and the like. Thus, when a voltage is applied to the to-be-treated water, a current flows (electric leak), resulting in power consumption and voltage drop. When power consumption and voltage drop occur, the water treatment efficiency decreases due to nonuniform electric discharge or energy loss that does not contribute to the water treatment.

In the water treatment apparatus of Patent Document 2, to-be-treated water is splashed onto the insulators during water treatment, and the surfaces of the insulators connecting the ground electrode and the high-voltage electrodes get wet with the to-be-treated water. Therefore, in the conventional water treatment apparatus, electric leak may occur between the ground electrode and the high-voltage electrodes during water treatment, and the water treatment efficiency may decrease.

In the water treatment apparatus of Patent Document 1, a support frame for suspending the linear electrodes is fixed via an insulator at the top of the container, and this insulating part is less likely to get wet with the to-be-treated water. However, in this structure, due to the sprinkling of the to-be-treated water, the suspended linear electrodes may swing, particularly when the flow rate is increased in order to increase the treatment efficiency. Therefore, there is a concern that the interval between the linear electrodes or the intervals between the linear electrodes and the plate-shaped electrodes fluctuate, and stable electric discharge cannot be maintained, resulting in a decrease in water treatment efficiency.

The present disclosure has been made to solve the above problems, and an object of the present disclosure is to obtain a water treatment apparatus that can inhibit electric leak between a ground electrode and a high-voltage electrode and can treat to-be-treated water with high efficiency.

Solution to the Problems

A water treatment apparatus according to the present disclosure is a water treatment apparatus including: flat-plate-shaped ground electrodes arranged at regular intervals in a horizontal direction; a high-voltage electrode unit disposed between the adjacent ground electrodes so as to oppose the ground electrodes; and a water supply unit for supplying to-be-treated water to between the adjacent ground electrodes, wherein treatment of the to-be-treated water is performed by electric discharge formed between the ground electrodes and the high-voltage electrode unit, the water treatment apparatus includes a support structure supporting the ground electrodes and supporting an insulating member connected to the high-voltage electrode unit, and an upper end portion of the insulating member is disposed above the water supply unit.

Effect of the Invention

Owing to the above configuration, it is possible to provide a water treatment apparatus in which the intervals between the ground electrodes and the high-voltage electrode can be maintained, a portion higher than the water supply unit can be provided between the ground electrodes and the high-voltage electrode, and electric leak between the ground electrodes and the high-voltage electrode can be inhibited, thereby treating the to-be-treated water with high efficiency.

DESCRIPTION OF EMBODIMENTS

Figure 1:
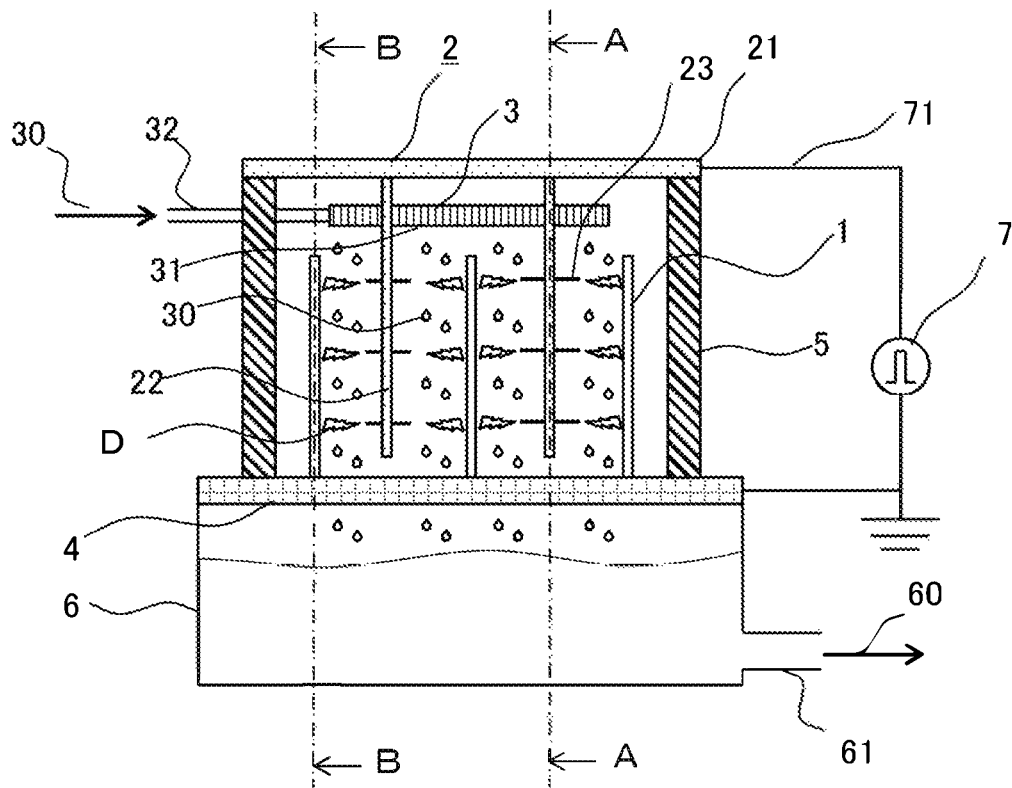
FIG. 1 is a cross-sectional view showing the configuration of a water treatment apparatus according to Embodiment 1.

Hereinafter, embodiments will be described with reference to the drawings. In the respective drawings, the same reference characters denote the same or corresponding parts.

Embodiment 1

Embodiment 1 will be described with reference to FIGS. 1 to 3.

Figure 2:
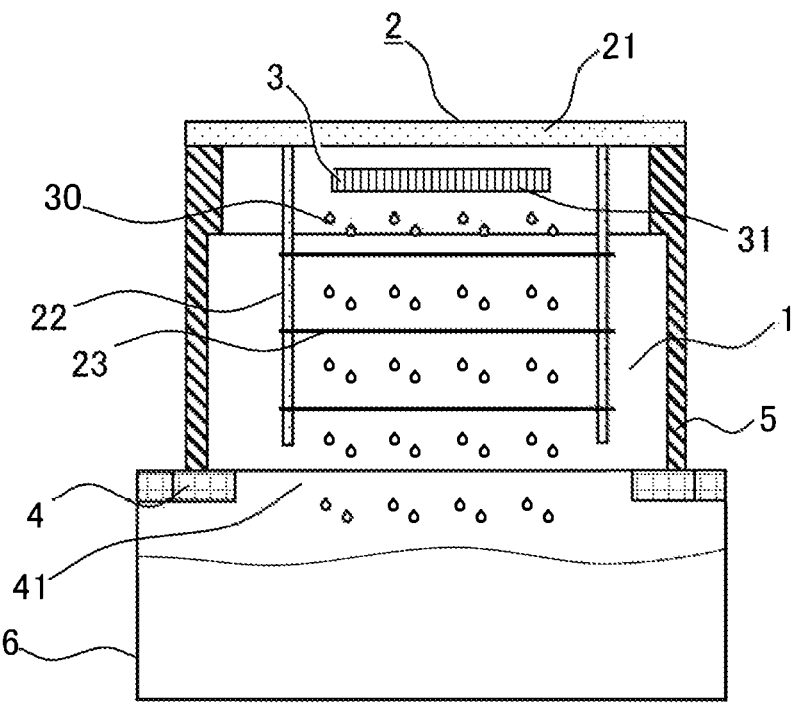
FIG. 2 is a cross-sectional view of FIG. 1 as seen in a line A-A direction.
Figure 3:
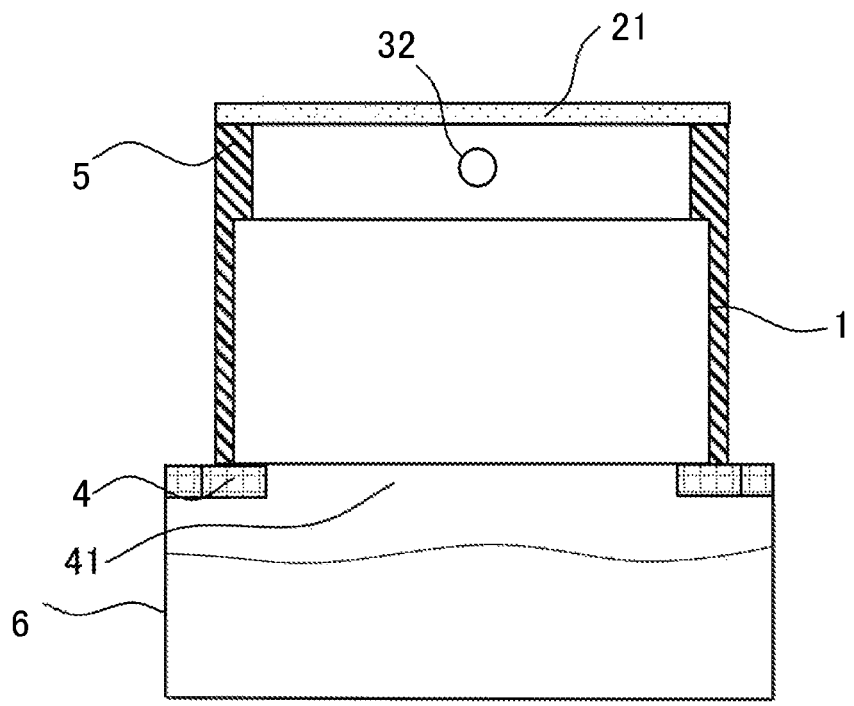
FIG. 3 is a cross-sectional view of FIG. 1 as seen in a line B-B direction.

FIG. 1 is a cross-sectional view showing the configuration of a water treatment apparatus according to Embodiment 1, FIG. 2 is a cross-sectional view of FIG. 1 as seen in a line A-A direction, and FIG. 3 is a cross-sectional view of FIG. 1 as seen in a line B-B direction in FIG. 1.

In the drawings, the water treatment apparatus includes a plurality of ground electrodes 1 supported by a support structure 4 in the vertical direction, a high-voltage electrode unit 2 for forming electric discharge between the ground electrodes 1 and the high-voltage electrode unit 2, a water supply unit 3 for supplying to-be-treated water to between the ground electrodes 1 and the high-voltage electrode unit 2, insulating members 5 supporting the high-voltage electrode unit 2, and a treated water tank 6, having the support structure 4 fixed to an upper portion thereof, for storing treated water.

As shown in FIGS. 1 and 3, The ground electrodes 1 are each a flat-plate-shaped conductive member, are arranged at predetermined intervals in a horizontal direction so as to be parallel to each other, and are fixed and supported at lower ends thereof in the vertical direction by the support structure 4.

As shown in FIGS. 1 and 2, the high-voltage electrode unit 2 includes a voltage receiving portion 21 for receiving a high voltage from a pulse power supply 7, and support portions 22 connected to the voltage receiving portion 21 and supporting both ends of counter electrode portions 23 opposing the ground electrodes 1. The counter electrode portions 23 are each a thin-plate-shaped conductive member and are horizontally disposed between the adjacent ground electrodes 1. In addition, a plurality of the counter electrode portions 23 are provided at predetermined intervals in the vertical direction so as to be parallel to each other, are provided between the adjacent ground electrodes 1, and are provided equidistantly from the adjacent ground electrodes 1. When a pulse voltage is applied from the pulse power supply 7 to the high-voltage electrode unit 2, electric discharge D is formed in a planar shape between the ground electrodes 1 and the sides, of the counter electrode portions 23, opposing the ground electrodes 1. One terminal of the pulse power supply 7 is connected to the high-voltage electrode unit 2 by a connection wire 71, and another terminal of the pulse power supply 7 is connected to the ground electrodes 1 via the support structure 4 and is commonly grounded.

To-be-treated water passes through the electric discharge D formed in a planar shape, which will be described later.

Moreover, the voltage receiving portion 21 of the high-voltage electrode unit 2 is fixed to an upper end portion, in the vertical direction, of each insulating member 5, and lower end portions of the support portions 22 are located above the support structure 4 which supports the ground electrodes 1.

Each insulating member 5 is, for example, formed in a columnar or rod shape, and a lower end portion, in the vertical direction, of each insulating member 5 is fixed to the support structure 4. The upper end portion of each insulating member 5 extends to above the water supply unit 3 and fixes the voltage receiving portion 21 of the high-voltage electrode unit 2 at the upper end thereof.

Since the ground electrodes 1 and the insulating members 5 are fixed to the support structure 4, and the high-voltage electrode unit 2 is fixed to the upper ends of the insulating members 5 fixed to the support structure 4, the intervals between the ground electrodes 1 and the counter electrode portions 23 of the high-voltage electrode unit 2 are accurately maintained.

The water supply unit 3 is provided above the ground electrodes 1 in the vertical direction, and is a sprinkling device connected to a water supply pipe 32 through which to-be-treated water 30 is supplied. Sprinkling holes 31 are formed in a surface, opposing the ground electrodes 1, of the water supply unit 3, and the to-be-treated water 30 is supplied from the sprinkling holes 31 to between the adjacent ground electrodes 1 located below the sprinkling holes 31 in the vertical direction. The water supply unit 3 is disposed so as to be located below the position where the voltage receiving portion 21 of the high-voltage electrode unit 2 and each insulating member 5 are fixed to each other.

The support structure 4 is fixed to an upper portion of the treated water tank 6 and is composed of a conductive member having an opening 41. The to-be-treated water 30 supplied from the water supply unit 3 to between the ground electrodes 1 is exposed to the electric discharge D, then passes through the opening 41 of the support structure 4, drops into the treated water tank 6, and is collected therein.

The to-be-treated water 30 collected in the treated water tank 6 is retained in the treated water tank 6 for a certain period of time and then is drained as treated water 60 through a drainage pipe 61.

Next, basic operation of the water treatment apparatus according to Embodiment 1 will be described. The to-be-treated water 30 supplied from the outside through the water supply pipe 32 to the water supply unit 3 is supplied in the form of droplets or liquid film from the sprinkling holes 31 to between the adjacent ground electrodes 1 located below the sprinkling holes 31. At this time, the pulse power supply 7 is operated to apply a pulsed high voltage between the ground electrodes 1 and the high-voltage electrode unit 2, thereby forming the electric discharge D between the ground electrodes 1 and the counter electrode portions 23. The electric discharge D is distributed and formed between the ground electrode 1 and the counter electrode portions 23 so as to form a surface in the horizontal direction. The to-be-treated water 30 comes into contact with the formed electric discharge D while passing between the adjacent ground electrodes 1. At this time, active species formed by the electric discharge D are dissolved in the to-be-treated water 30. As a result, water treatment such as removal of hardly-decomposable substances is performed on the to-be-treated water 30.

The counter electrode portions 23 are each a thin-plate-shaped conductive member extending in the depth direction of the sheet of FIG. 1, and are arranged horizontally in multiple stages between the adjacent ground electrodes 1. Thus, the space of the electric discharge D formed in a planar shape is also formed in multiple stages, and the to-be-treated water 30 supplied from the water supply unit 3 to between the ground electrodes 1 always comes into contact with the electric discharge D when passing between the ground electrodes 1. Therefore, the to-be-treated water 30 can be treated with high efficiency.

Next, the principle by which the water treatment apparatus according to Embodiment 1 performs the treatment on the to-be-treated water 30 will be described. Here, a description will be given with decomposition of organic matter as an example. Active species such as $O_3$ and OH radicals generated by electric discharge are well known to also be effective for disinfection, decolorization, or deodorization.

As gas supplied to between the adjacent ground electrodes 1, air, oxygen, rare gases (argon, neon), etc., are used. By applying a high-voltage pulse between the ground electrodes 1 and the high-voltage electrode unit 2, electric discharge occurs at the gas layers between the ground electrodes 1 and the counter electrode portions 23, or at the interfaces between the ground electrodes 1 and the to-be-treated water 30 passing between the adjacent ground electrodes 1. At this time, oxygen molecules ($O_2$) and water molecules ($H_2O$) collide against high-energy electrons and dissociation reactions in formula (1) and formula (2) take place. Here, "e" represents electron, O represents atomic oxygen, H represents atomic hydrogen, and OH represents OH radical.

$$e + O_2 \rightarrow 2O \tag{1}$$

$$e + H_2O \rightarrow H + OH \tag{2}$$

Part of atomic oxygen generated in formula (1) becomes ozone ($O_3$) by formula (3). Here, M represents a third body in the reaction, and represents every molecule or atom in the air.

$$O + O_2 + M \rightarrow O_3 \tag{3}$$

In addition, part of OH radical generated in formula (2) becomes hydrogen peroxide ($H_2O_2$) by a reaction in the following formula (4).

$$OH + OH \rightarrow H_2O_2 \tag{4}$$

Then, oxidizing active species such as O, OH, $O_3$, and $H_2O_2$ generated by the reactions in formulas (1) to (4) oxidatively decompose organic matter in the to-be-treated water 30 into carbon dioxide ($CO_2$) and water by a reaction in formula (5). Here, R represents organic matter to be treated.

$$R + (O, OH, O_3, H_2O_2) \rightarrow CO_2 + H_2O \tag{5}$$

Meanwhile, part of $O_3$ and $H_2O_2$ generated in formula (3) and formula (4) is dissolved into the to-be-treated water 30 through the surface of the to-be-treated water 30 by formula (6) and formula (7). Here, (L) means a liquid phase.

$$O_3 \rightarrow O_3(L) \tag{6}$$

$$H_2O_2 \rightarrow H_2O_2(L) \tag{7}$$

Furthermore, by reaction between $O_3$ (L) and $H_2O_2$ (L), OH radical is generated in the water as shown in formula (8).

$$O_3(L) + H_2O_2(L) \rightarrow OH(L) \tag{8}$$

$O_3$ (L), $H_2O_2$ (L), and OH (L) generated in formulas (6) to (8) decompose the organic matter through the reaction in the water by formula (9).

$$R + (O_3(L), OH(L), H_2O_2(L)) \rightarrow CO_2 + H_2O \tag{9}$$

As described above, the decomposition of the organic matter in the to-be-treated water 30 according to Embodiment 1 proceeds as both decomposition of the organic matter on the surface of the to-be-treated water 30 by the reaction in formula (5) and decomposition of the organic matter in the to-be-treated water 30 by the reaction in formula (9).

The to-be-treated water 30 collected in the treated water tank 6 is retained in the treated water tank 6 for a certain period of time in order to decompose organic matter by the reaction in formula (9), and then is drained as the treated water 60 through the drainage pipe 61.

In order to perform high-efficiency water treatment, it is important that stable discharge can be formed without electric leak or the like in a discharge circuit. Realization of high-efficiency water treatment by the water treatment apparatus according to Embodiment 1 will be described below.

The ground electrodes 1 and the insulating members 5, which fix the high-voltage electrode unit 2, are supported by the same support structure 4. The water supply unit 3 is located below the position where the high-voltage electrode unit 2 and each insulating member 5 are fixed to each other, and the to-be-treated water 30 is supplied from the sprinkling holes 31 of the water supply unit 3 to between the ground electrodes 1 located at the lower side opposite in the vertical direction to the position where the high-voltage electrode unit 2 and each insulating member 5 are fixed to each other. That is, the position where the high-voltage electrode unit 2 and each insulating member 5 are fixed to each other is a position that is not wetted with the to-be-treated water 30 from the sprinkling holes 31, so that there is no risk of electric leak due to wetting with the to-be-treated water 30.

In addition, the lower end portions of the support portions 22 of the high-voltage electrode unit 2 are located above the support structure 4 through the space, that is, the gas layer without being in contact with the support structure 4. The counter electrode portions 23 of the high-voltage electrode unit 2 are insulated through the gas layer, except for the electric discharge D, below the water supply unit 3. Therefore, even when the to-be-treated water 30 is supplied to between the ground electrodes 1 and water treatment is performed, the high-voltage electrode unit 2 is also insulated below the water supply unit 3 in the vertical direction. That is, the high-voltage electrode unit 2 and the ground electrodes 1 form a closed circuit through the electric discharge D, and there is no electric leak part. Thus, stable electric discharge can be realized.

Meanwhile, if the position where the high-voltage electrode unit 2 and each insulating member 5 are fixed to each other is lower and is located in the direction in which the to-be-treated water 30 is sprinkled, the position where the high-voltage electrode unit 2 and each insulating member 5 are fixed to each other may be wetted with the to-be-treated water 30, and electric leak may occur through the surfaces of the insulating members 5. In addition, when the lower end portions of the support portions 22 of the high-voltage electrode unit 2 are brought into contact with the ground electrodes 1, the support structure 4, or another member directly or indirectly through a certain member due to vibration or the like, electric leak occurs through the surface of the member if the surface of the member gets wet with the to-be-treated water 30.

Since the position where the high-voltage electrode unit 2 and each insulating member 5 of the present embodiment are fixed to each other is a position that is not wetted with the to-be-treated water 30 from the sprinkling holes 31, there is no risk of electric leak due to wetting with the to-be-treated water 30.

Moreover, since the ground electrodes 1 and the insulating members 5 are fixed to the support structure 4, and the high-voltage electrode unit 2 is fixed to the upper ends of the insulating members 5 fixed to the support structure 4, the intervals between the ground electrodes 1 and the high-voltage electrode unit 2 are accurately maintained. Since the support portions 22 of the high-voltage electrode unit 2 are also fixed to the voltage receiving portion 21 and held at a predetermined interval with respect to the ground electrodes 1 or the support structure 4, there is a low possibility that the support portions 22 are brought into contact with the ground electrodes 1 or the support structure 4 indirectly through a member, and there is no risk of electric leak.

Although the lower ends of the ground electrodes 1 are fixed to the support structure 4, since the other terminal of the pulse power supply 7 is connected to the ground electrodes 1 via the support structure 4, and the ground electrodes 1 and the support structure 4 are installed at a common potential, even when the portion where the ground electrodes 1 and the support structure 4 are fixed to each other gets wet with the to-be-treated water 30, no potential difference occurs in the to-be-treated water 30, and thus electric leak does not occur.

As described above, with the configuration of the present embodiment, there is no risk of electric leak, and stable discharge can be realized.

Furthermore, in Embodiment 1, the lower ends of the support portions 22 of the high-voltage electrode unit 2 are located above the lower ends, in the vertical direction, of the ground electrodes 1. With such an arrangement, the counter electrode portions 23 of the high-voltage electrode unit 2 are shielded from the surroundings by the ground electrodes 1. Thus, an electric field is stably formed between the counter electrode portions 23 and the ground electrodes 1, so that it is possible to stably form the electric discharge D.

As described above, according to Embodiment 1, since the ground electrodes 1 and the insulating members 5 are fixed to the support structure 4, and the high-voltage electrode unit 2 is fixed to the upper ends of the insulating members 5 fixed to the support structure 4, the intervals between the ground electrodes 1 and the high-voltage electrode unit 2 are accurately maintained. In addition, the portion where the high-voltage electrode unit 2 and each insulating member 5 are connected to each other can also be located above the water supply unit 3 and located in the direction opposite to the sprinkling direction. Therefore, electric leak between the ground electrodes 1 and the high-voltage electrode unit 2 is inhibited, so that it is possible to treat to-be-treated water with high efficiency by stable electric discharge.

In addition, since the counter electrode portions 23, of the high-voltage electrode unit 2, opposing the ground electrodes 1, are provided in multiple stages in the direction in which to-be-treated water passes, and planar electric discharge is formed in multiple stages between the ground electrodes 1, such electric discharge contributes to high-efficiency treatment of the to-be-treated water 30.

The example in which the pulse power supply 7 is used for forming electric discharge has been described. However, the power supply used in the present embodiment does not necessarily need to be a pulse power supply as long as electric discharge can be stably formed, and the power supply may be, for example, an AC power supply or a DC power supply.

The polarity, the voltage peak value, the repetition frequency, the pulse width, and the like of the voltage to be outputted from the pulse power supply 7 can be determined as appropriate in accordance with various conditions such as the structures of the ground electrodes 1 and the high-voltage electrode unit 2 and the gas type of the gas layer. Generally, the voltage peak value is desirably 1 kV to 50 kV. If the voltage peak value is less than 1 kV, stable electric discharge is not formed, and, in order to make the voltage peak value greater than 50 kV, it is necessary to increase the size of the power supply and enhance electrical insulation, which leads to a significant increase in the production cost and the maintenance cost.

The repetition frequency is desirably not less than 10 pps (pulse-per-second) and not greater than 100 kpps. If the repetition frequency is less than 10 pps, a very high voltage is needed for applying sufficient electric discharge power. On the other hand, if the repetition frequency is greater than 100 kpps, the effect of water treatment becomes saturated, so that the power efficiency decreases. The voltage peak value, the repetition frequency, and the pulse width may be adjusted in accordance with the flow rate of the to-be-treated water 30, or components contained in the to-be-treated water 30 or the concentrations thereof.

In the above, the example in which the to-be-treated water 30 is supplied in the form of droplets or liquid film from the sprinkling holes 31 provided in the flat-plate-shaped water supply unit 3 has been described. However, the flat-plate-shaped water supply unit 3 used in the present embodiment does not necessarily need to have the sprinkling holes 31 as long as the water supply unit 3 can supply the to-be-treated water 30 in the form of droplets or liquid film to between the ground electrodes 1. For example, a spray nozzle or a dispenser can be used. By using the flat-plate-shaped water supply unit 3 having the sprinkling holes 31, even when the number of ground electrodes 1 or the state of to-be-treated water is different, expansion can be easily achieved by changing the area of the water supply unit 3 and the diameters and the number of the sprinkling holes 31. Thus, the design cost can be reduced, and the cost of the water treatment apparatus can be reduced. In addition, in the case where a spray nozzle or a dispenser is used, the diameters of droplets of the to-be-treated water 30 can be controlled, and the water treatment efficiency can be improved.

Moreover, the flow rate of the to-be-treated water 30 supplied from the water supply unit 3 to between the ground electrodes 1, the number of droplets formed therefrom, the diameters of the droplets, etc., can be adjusted as appropriate in accordance with the quality of the to-be-treated water 30 or the types of the substances contained in the to-be-treated water 30. When the diameters of the droplets are smaller, the specific surface area of the to-be-treated water 30 increases, and the transport efficiency of the active species into the to-be-treated water 30 and the water treatment efficiency increase. Thus, the diameters of the droplets are preferably smaller. In order to improve the water treatment efficiency, the diameters of the droplets are preferably equal to or less than 1 mm.

The water treatment apparatus according to Embodiment 1 may be housed in a sealed or semi-sealed container that is not shown. By housing the water treatment apparatus in the container, the type of gas in the container can be controlled, so that the stability of the electric discharge D can be improved and impurities can be prevented from entering the to-be-treated water 30 from the gas phase. In addition, by housing the water treatment apparatus in the sealed or semi-sealed container and providing the pulse power supply 7 outside the container, deterioration of the pulse power supply 7 due to spray or steam of the to-be-treated water 30 or active species generated by electric discharge can be prevented.

In the present embodiment, the ground electrodes 1 are formed from a conductive material, and a metal material having excellent corrosion resistance such as stainless steel or titanium is particularly preferably used. The ground electrodes 1 can be thinned as long as the mechanical strength thereof can be maintained, or a structure such as mesh or perforated metal can be used. Since the weights of the ground electrodes 1 can be reduced by thinning the ground electrodes 1, the mechanical strength of the support structure 4 can be reduced and the cost of the water treatment apparatus can be reduced. Moreover, similar to the counter electrode portions 23 of the high-voltage electrode unit 2, the ground electrodes 1 may each have a structure having an electrode portion that is horizontally extended in a direction orthogonal to the direction in which the plurality of ground electrodes 1 are arranged. When the ground electrodes 1 are also formed with the same electrode structure as the counter electrode portions 23 of the high-voltage electrode unit 2 and are opposed to the counter electrode portions 23 of the high-voltage electrode unit 2, an electric field can be concentrated and the position where the electric discharge D is formed can be accurately determined, so that the treatment efficiency of the to-be-treated water 30 flowing downward is improved.

The high-voltage electrode unit 2 is formed from a conductive material, and a metal material having excellent corrosion resistance such as stainless steel or titanium is particularly preferably used. In Embodiment 1, the thin-plate-shaped counter electrode portions 23 are used. However, it is sufficient that a strong electric field is formed at the counter electrode portions 23 by a high voltage pulse, and the shapes of the counter electrode portions 23 do not necessarily need to have a thin plate shape. For example, a wire, a plate having a large number of needles or screws fixed thereto in a comb tooth manner, a plate having a mesh shape, a perforated metal, or the like can be used as appropriate as each counter electrode portion 23. The thin plate shape can ensure mechanical strength and can improve the durability of the high-voltage electrode unit 2, as compared to the other shapes. Thus, the thin plate shape is preferable. In addition, since the wire shape can increase the opening ratio, viewed from the vertical direction, between the ground electrodes 1, the interval between the adjacent ground electrodes 1 can be smaller than in the case of the other shapes, so that the size of the water treatment apparatus can be reduced.

In Embodiment 1, the counter electrode portions 23 are provided above the lower end portion, in the vertical direction, of the high-voltage electrode unit 2. With such a configuration, the to-be-treated water 30 is inhibited from accumulating at the lower end portion, in the vertical direction, of the high-voltage electrode unit 2, and the electric discharge D can be inhibited from becoming unstable due to distortion of an electric field at the lower end portion of the high-voltage electrode unit 2 that is caused by the accumulation of the to-be-treated water 30. For example, when the counter electrode portions 23 are made from the above-described mesh plate, the to-be-treated water 30 does not accumulate on the counter electrode portions 23.

The support structure 4 is formed from a conductive material, and a metal material having excellent corrosion resistance such as stainless steel or titanium is particularly preferably used. In Embodiment 1, the support structure 4 having a rectangular cross section is used. However, it is sufficient that the support structure 4 has mechanical strength capable of holding the ground electrodes 1, the high-voltage electrode unit 2, and the insulating members 5. For example, a member having a circular, H-shaped, I-shaped, or T-shaped cross-section, a hollow member, or the like can be used as appropriate as a frame material forming the support structure 4. The H shape and the like can achieve weight reduction while maintaining the mechanical strength, so that the manufacturing cost of the support structure 4 and the water treatment apparatus can be reduced.

The example in which the support structure 4 is fixed to the upper portion of the treated water tank 6 has been described above. However, the support structure 4 may be disposed above support legs (not shown) fixed to a bottom portion of the treated water tank 6 and be held above the treated water tank 6. In the case where the support structure 4 is mounted to the treated water tank 6, the number of components of the water treatment apparatus is smaller than in the case where support legs are used. Thus, the cost of the water treatment apparatus can be reduced, and the size of the water treatment apparatus can be reduced. In the case where the support structure 4 is held above the treated water tank 6 by support legs, the support structure 4 can be firmly supported, so that the ground electrodes 1 and the high-voltage electrode unit 2 can be stably fixed even when the sizes of the ground electrodes 1 and the high-voltage electrode unit 2 are increased. In addition, since the support legs are fixed to the bottom portion of the treated water tank 6, vibration of the support structure 4 due to transportation of the to-be-treated water 30, vibration of a pump 34, or the like can be inhibited.

The treated water tank 6 can be formed using any material capable of storing the to-be-treated water 30. In particular, a material having excellent corrosion resistance, such as stainless steel, titanium, ceramic materials including quartz and alumina, and fluorine resin, is preferably used. Moreover, since the reaction in formula (9) proceeds in water, decomposition of the organic matter remaining in the to-be-treated water 30 having dropped through the electric discharge D may be promoted by extending the residence time of the to-be-treated water 30 or stirring the to-be-treated water 30. For achieving this, a baffle, a stirring mechanism, or an air diffuser for introducing a gas into the to-be-treated water 30 to promote the reaction may be provided in the treated water tank 6.

Each insulating member 5 can be formed using an electrically insulating material having high electric resistance. For example, a glass material such as quartz and borosilicate glass, an engineering ceramic material such as alumina and zirconia, an engineering plastic material such as fluorine resin, a combination thereof, or the like can be used as the material of each insulating member 5. Moreover, it is sufficient that each insulating member 5 is formed from an electrically insulating material at least at the position where the high-voltage electrode unit 2 and the insulating member 5 are fixed to each other, and a conductive material may be used for an inner portion of the insulating member 5 and a portion of the insulating member 5 except for the position where the high-voltage electrode unit 2 and the insulating member 5 are fixed to each other. When each insulating member 5 has a two-layer structure including a conductive material located inside and an external insulating material, the flexibility in material design is increased and it is possible to improve the mechanical strength of each insulating member 5. As a result, the intervals between the ground electrodes 1 and the high-voltage electrode unit 2 can be further accurately maintained.

Figure 4:
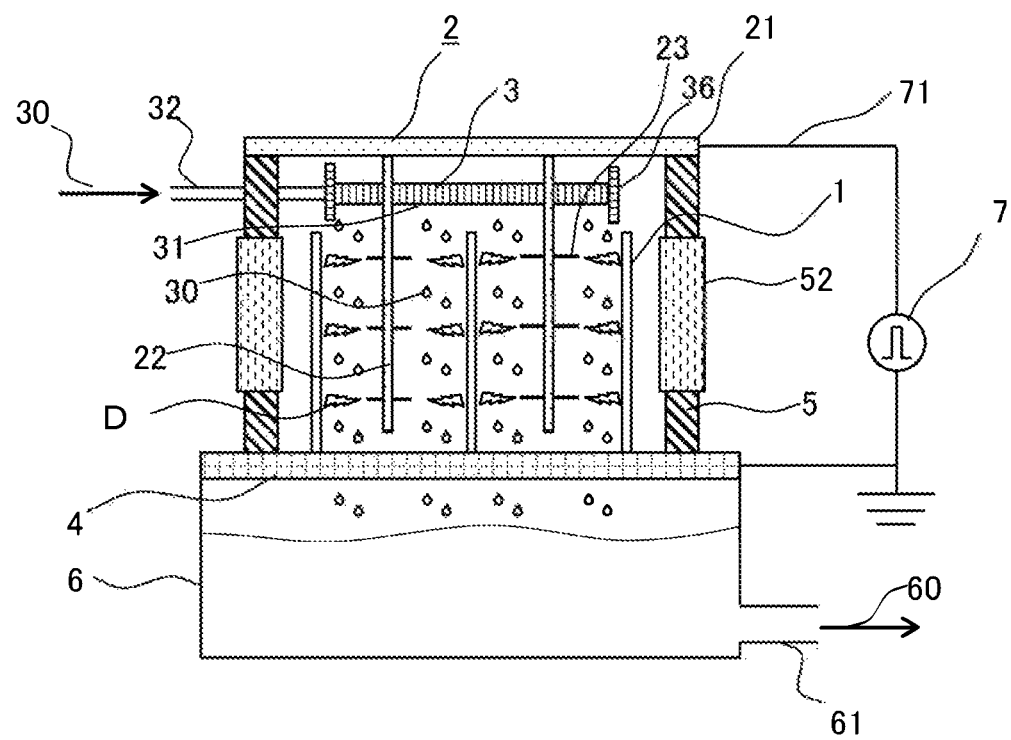
FIG. 4 is a cross-sectional view showing the configuration of another water treatment apparatus according to Embodiment 1.

As shown in FIG. 4, a water-repellent portion 52 may be provided on at least a part of the surface of each insulating member 5 which is formed in a columnar shape. Furthermore, a shielding plate 36 for preventing scattering of the to-be-treated water 30 may be provided around the water supply unit 3.

FIG. 4 is a cross-sectional view showing the configuration of another water treatment apparatus according to Embodiment 1. FIG. 4 shows that the water-repellent portion 52 covering a part of the surface of each insulating member 5 and the shielding plate 36 around the water supply unit 3 are provided in the configuration of FIG. 1.

Since the to-be-treated water 30 is repelled on the surface of the water-repellent portion 52 provided on the surface of each insulating member 5, insulation is maintained at the position of each insulating member 5 where the water-repellent portion 52 is provided. Therefore, the electric leak inhibition effect can be improved. The water-repellent portion 52 may be provided over the entire surface of each insulating member 5. However, since insulation is maintained at the place where the water-repellent portion 52 is provided, it is sufficient that the water-repellent portion 52 is provided on at least a part of the surface of each insulating member 5.

In addition, the shielding plate 36 provided around the water supply unit 3 inhibits scattering in the direction toward the insulating member 5, particularly to the portion where each insulating member 5 and the high-voltage electrode unit 2 are connected to each other. Therefore, each insulating member 5 and the portion where each insulating member 5 and the high-voltage electrode unit 2 are connected to each other can be inhibited from getting wet with the to-be-treated water 30 due to scattering of the to-be-treated water 30, and the electric leak inhibition effect can be improved. It is not necessary to provide the shielding plate 36 over the entire periphery of the water supply unit 3, and it is sufficient that the shielding plate 36 is provided at least at a position that inhibits scattering in the direction toward each insulating member 5, particularly to the portion where each insulating member 5 and the high-voltage electrode unit 2 are connected to each other.

Furthermore, the portion, of the upper end portion of each insulating member 5 formed in a columnar shape, which is connected to the high-voltage electrode unit 2, and the portion, of the lower end portion of each insulating member 5, which is fixed to the support structure 4 may be made thinner than the other portion of each insulating member 5, thereby increasing the insulation distance.

Figure 5:
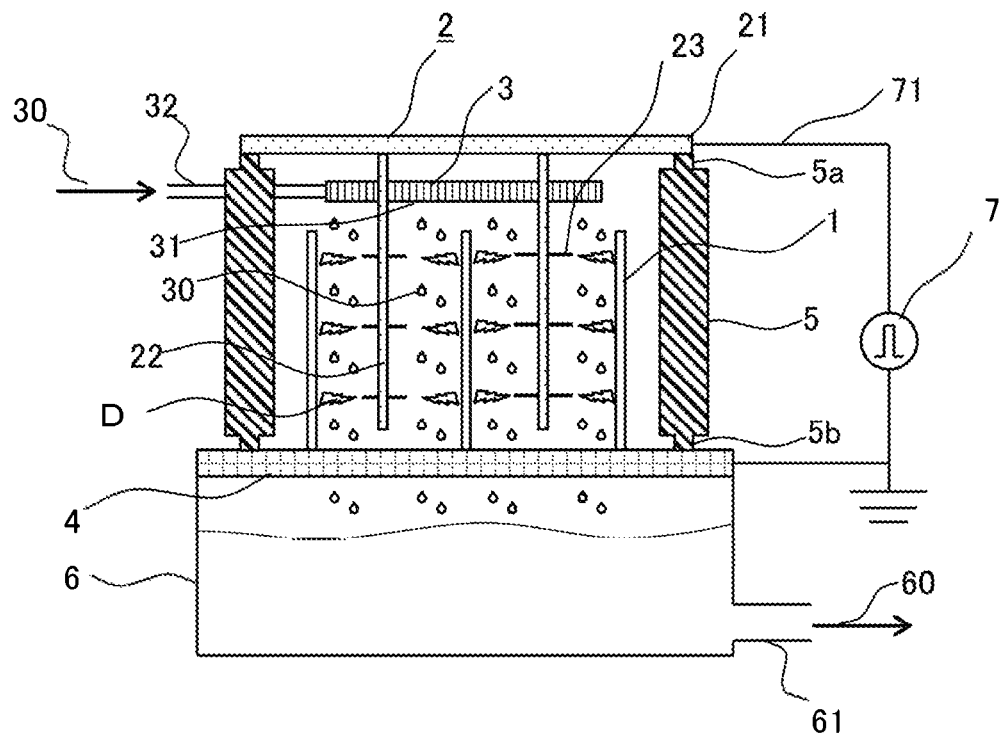
FIG. 5 is a cross-sectional view showing the configuration of still another water treatment apparatus according to Embodiment 1.

FIG. 5 is a cross-sectional view showing the configuration of still another water treatment apparatus according to Embodiment 1. FIG. 5 shows that an upper end portion 5a and a lower end portion 5b of each insulating member 5 in the configuration of FIG. 1 are made thinner than the other portion of each insulating member 5. Not only the insulation distance is ensured directly at the portion of the upper end portion connected to the high-voltage electrode unit 2 as described above, but also the insulation distance can be increased by providing recesses and projections on the entire surface of each insulating member 5 or on at least a part of the surface of each insulating member 5, that is, by changing the cross-sectional area of each insulating member 5 between the lower end portion and the upper end portion.

Embodiment 2

In Embodiment 1, decomposition of the organic matter remaining in the to-be-treated water 30 having dropped through the electric discharge D is promoted by extending the residence time, in the treated water tank 6, of the to-be-treated water 30 having passed through the electric discharge D or stirring the to-be-treated water 30. In Embodiment 2, a circulation pipe is provided so as to return the to-be-treated water 30 retained in the treated water tank 6 to the water supply pipe 32 of the water supply unit 3 in order to bring the to-be-treated water 30 into contact with the electric discharge D again.

Figure 6A:
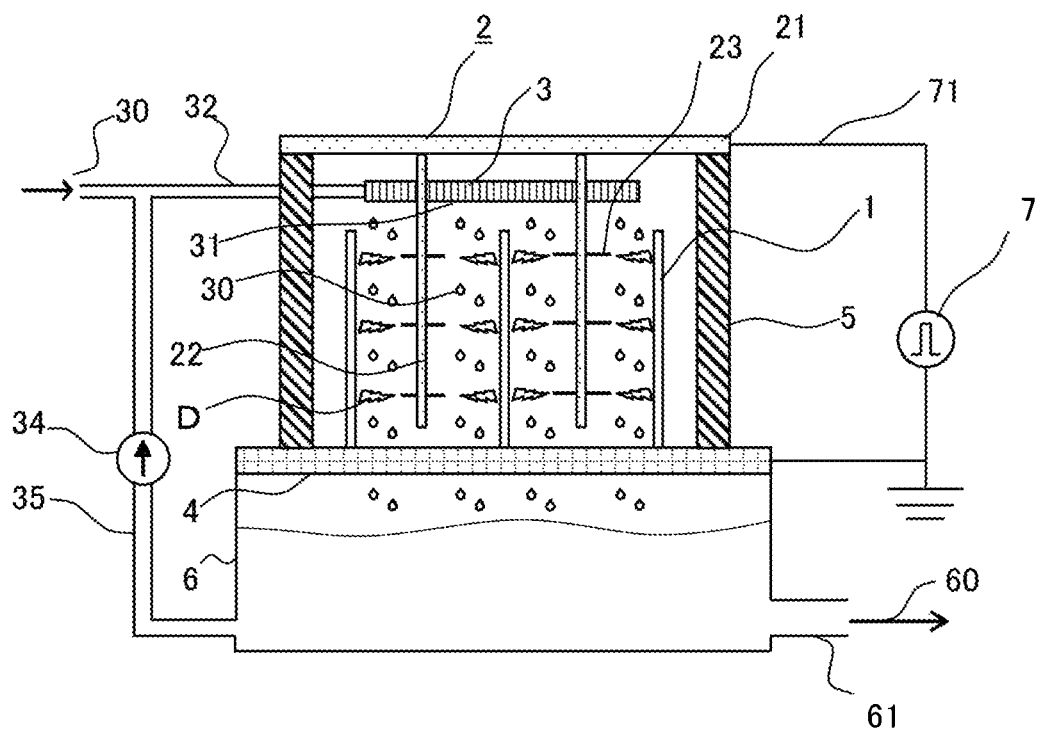
FIG. 6A is a cross-sectional view showing the configuration of a water treatment apparatus according to Embodiment 2.

FIG. 6A is a cross-sectional view showing the configuration of a water treatment apparatus according to Embodiment 2. In the drawing, one end of a circulation pipe 35 is connected to a wall surface, of the treated water tank 6, opposing the drainage pipe 61, and the other end of the circulation pipe 35 is connected to the water supply pipe 32 of the water supply unit 3. Decomposition of the organic matter can be promoted by sending the to-be-treated water 30 retained in the treated water tank 6 to the water supply unit 3 again with use of the pump 34 provided on the circulation pipe 35, and repeatedly bringing the to-be-treated water 30 into contact with the electric discharge D.

Figure 6B:
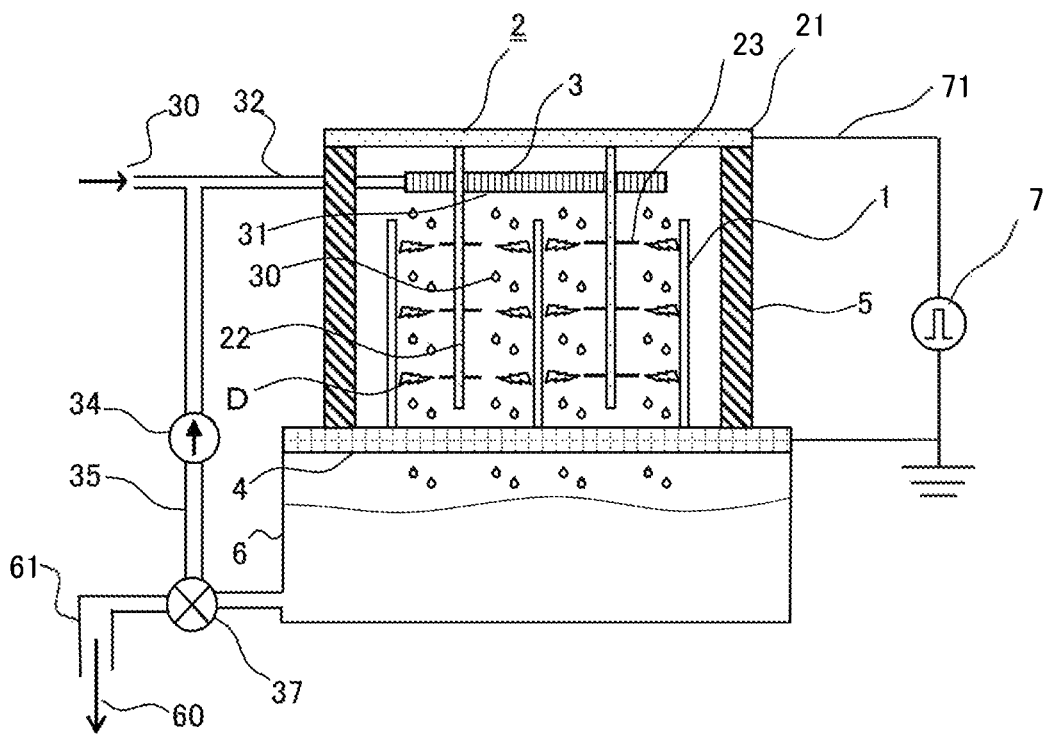
FIG. 6B is a cross-sectional view showing the configuration of a water treatment apparatus in which a part of a circulation pipe in FIG. 6A is changed.
Figure 6C:
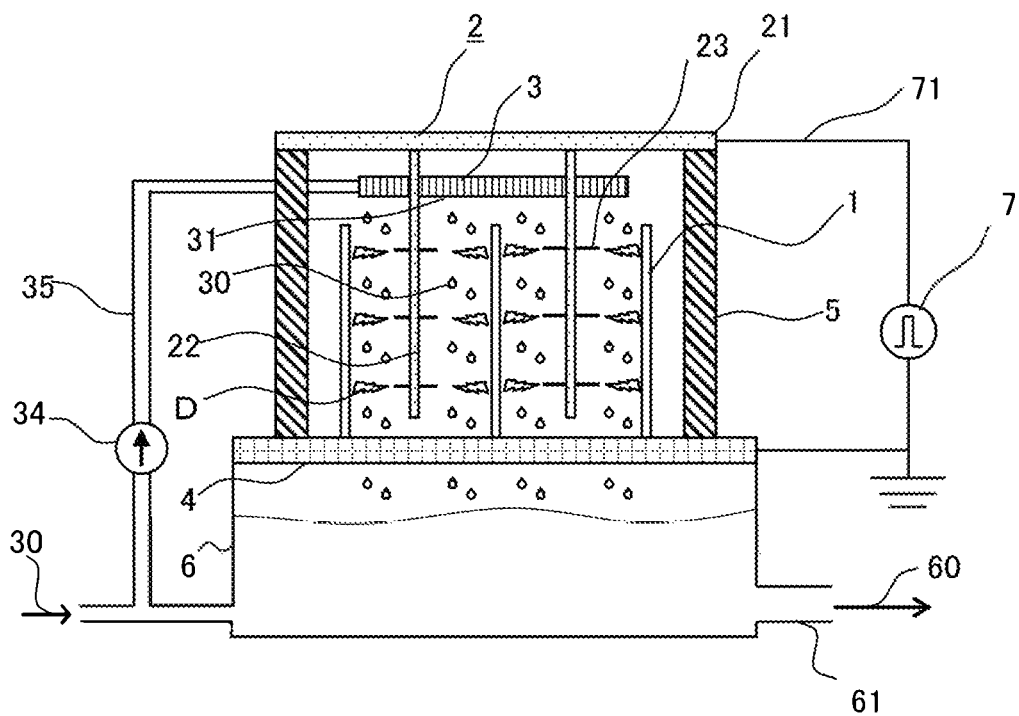
FIG. 6C is a cross-sectional view showing the configuration of another water treatment apparatus in which a part of the circulation pipe in FIG. 6A is changed.
Figure 6D:
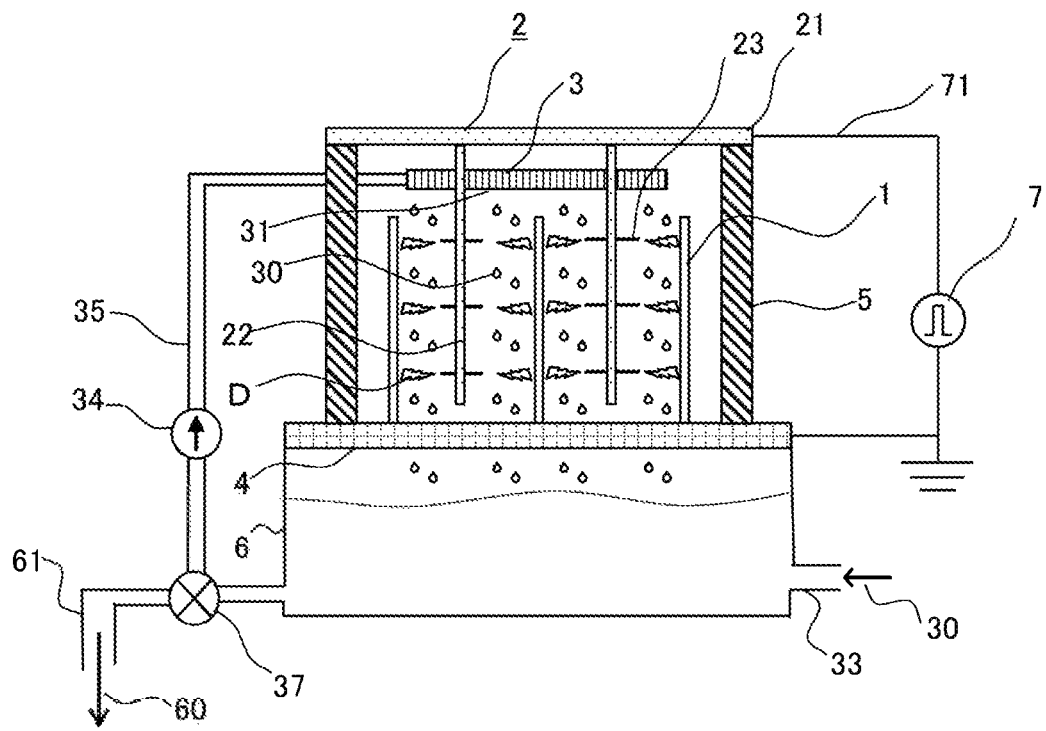
FIG. 6D is a cross-sectional view showing the configuration of still another water treatment apparatus in which a part of the circulation pipe in FIG. 6A is changed.

FIG. 6B, FIG. 6C, and FIG. 6D each show the configuration of a water treatment apparatus in which a part of the circulation pipe in FIG. 6A is changed.

Although the one end of the circulation pipe 35 is connected to the wall surface, of the treated water tank 6, opposing the drainage pipe 61 in FIG. 6A, the one end of the circulation pipe 35 may be connected to the drainage pipe 61 as shown in FIG. 6B. In this case, for example, a valve 37 may be provided, and whether to circulate, drain, or retain the water may be selected by the valve 37.

Moreover, although the other end of the circulation pipe 35 is connected to the water supply pipe 32 of the water supply unit 3 located at the upper side in FIG. 6A, a water supply pipe from the outside may be connected between the pump 34 and the treated water tank 6 as shown in FIG. 6C, and the flow rate of to-be-treated water to be supplied to the water supply unit 3 by the pump 34 or the ratio of the to-be-treated water to be supplied from the outside and the to-be-treated water to be circulated may be controlled.

Furthermore, in FIG. 6D, a water supply pipe 33 through which the to-be-treated water 30 is supplied from the outside is provided to the treated water tank 6, and the circulation pipe 35 is connected to the drainage pipe 61 via the valve 37, and whether to circulate, drain, or retain the water is selected by the valve 37. In addition, the pump 34 is provided on the circulation pipe 35 such that the flow rate can be adjusted.

With this configuration, the organic matter in the to-be-treated water 30 supplied from the outside through the water supply pipe 33 is initially decomposed in the treated water tank 6 by the reaction in formula (9). Thereafter, circulation to the water supply unit 3 is selected by the valve 37, and the to-be-treated water 30 is supplied at a predetermined flow rate by the pump 34. When a sensor is provided to the treated water tank 6 to measure the concentration of the organic matter in the to-be-treated water 30, and the flow rate of the to-be-treated water to be circulated is set or the intensity of electric discharge is controlled in accordance with the concentration of the organic matter, the load on the pump 34 and the pulse power supply 7 can be reduced. If the concentration of the organic matter by the sensor becomes equal to or less than a predetermined value, the to-be-treated water 30 is drained as the treated water 60 through the drainage pipe 61 by the valve 37.

Moreover, circulation and drainage may be performed simultaneously, and the ratio in flow rate between circulation and drainage may be controlled such that the concentration of the organic matter in the treated water tank 6 is constant. By performing circulation and drainage simultaneously as described above, it is possible to continuously perform water treatment, and integration into existing water treatment equipment is made easy.

Furthermore, when there is a correlation between the organic matter concentration and other parameters such as pH or chromaticity, dissolved ozone concentration, and hydrogen peroxide concentration, these parameters can be used as an index of the organic matter concentration.

The configuration of Embodiment 2 other than the circulation pipe 35 is the same as that of Embodiment 1, and, similarly, the materials or the configurations of the ground electrodes 1, the high-voltage electrode unit 2, the support structure 4, the insulating members 5, and the treated water tank 6 can be selected and can be changed.

As described above, with the configuration of Embodiment 2, the same advantageous effects as the embodiment I are achieved. Specifically, the intervals between the ground electrodes 1 and the high-voltage electrode unit 2 can be accurately maintained, and electric leak between the ground electrodes 1 and the high-voltage electrode unit 2 is inhibited, so that it is possible to treat to-be-treated water with high efficiency by stable electric discharge.

Furthermore, since to-be-treated water is repeatedly brought into contact with electric discharged by the circulation pipe 35, this repeated contact contributes to high-efficiency treatment of to-be-treated water.

Also, in FIG. 6A, FIG. 6B, FIG. 6C, and FIG. 6D, the water-repellent portion 52 covering a part of the surface of each insulating member 5 and the shielding plate 36 around the water supply unit 3 may be provided, or the upper end portion 5a and the lower end portion 5b of each insulating member 5 may be made thinner than the other portion of each insulating member 5.

Figure 7:
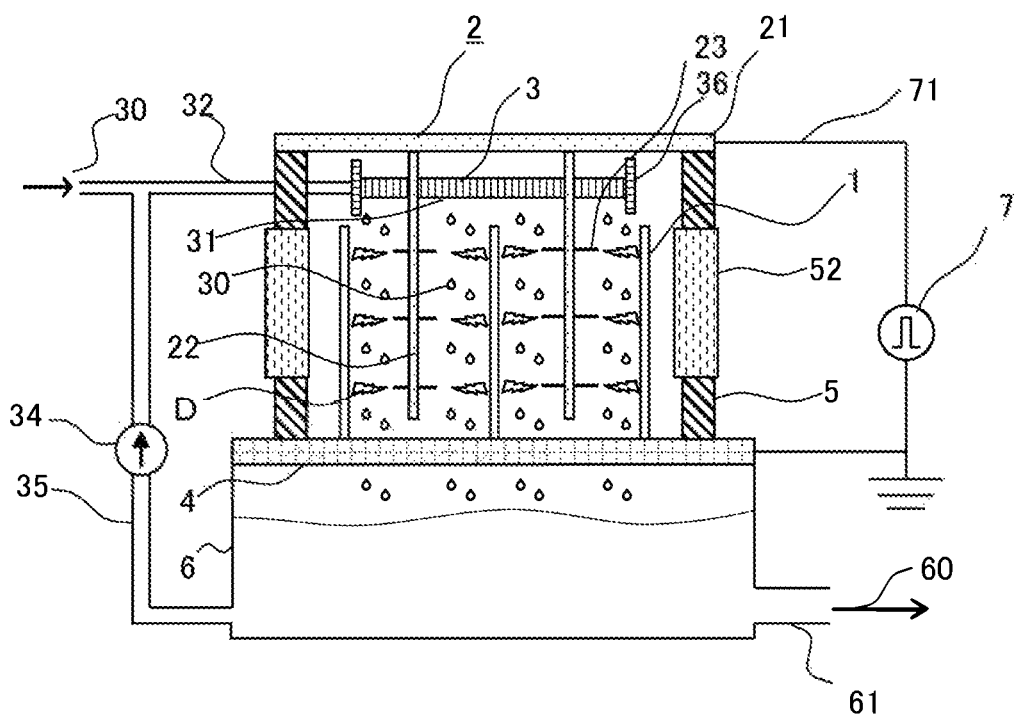
FIG. 7 is a cross-sectional view showing the configuration of another water treatment apparatus according to Embodiment 2.

FIG. 7 is a cross-sectional view showing the configuration of another water treatment apparatus according to Embodiment 2. FIG. 7 shows that the water-repellent portion 52 covering a part of the surface of each insulating member 5 and the shielding plate 36 around the water supply unit 3 are provided in the configuration of FIG. 6A.

Figure 8:
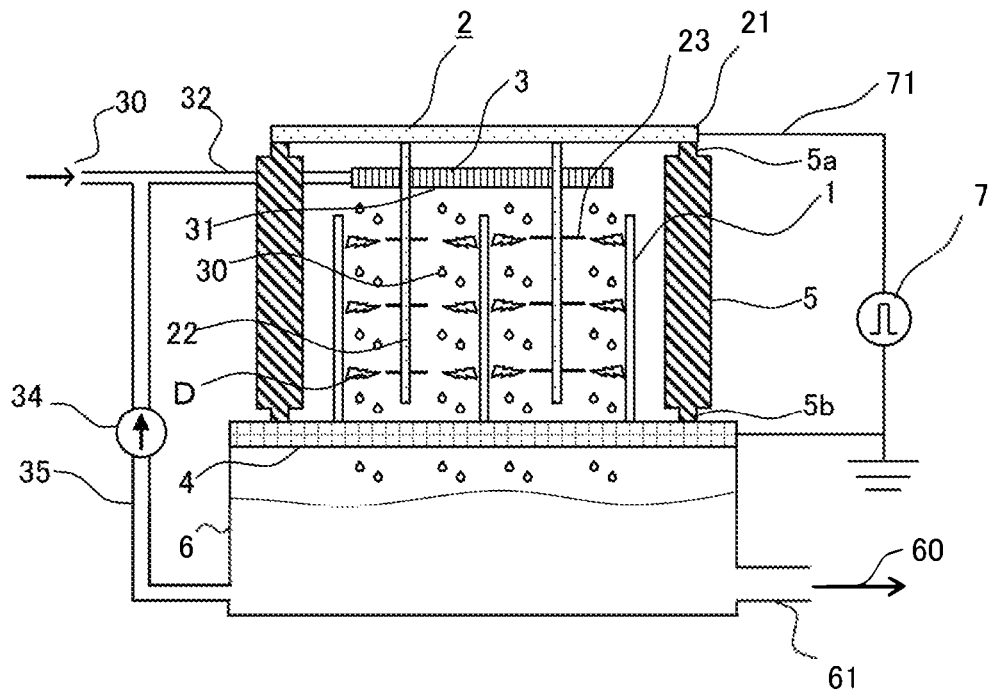
FIG. 8 is a cross-sectional view showing the configuration of still another water treatment apparatus according to Embodiment 2.

FIG. 8 is a cross-sectional view showing the configuration of still another water treatment apparatus according to Embodiment 2. FIG. 8 shows that the upper end portion 5a and the lower end portion 5b of each insulating member 5 in the configuration of FIG. 6A are made thinner than the other portion of each insulating member 5.

With the configurations of FIG. 7 and FIG. 8, as described in Embodiment 1, electric leak can be inhibited more than in FIG. 6A.

Embodiment 3

In Embodiment 1, the lower ends of the ground electrodes 1 and the insulating members 5 are fixed to the support structure 4. However, in Embodiment 3, the upper ends of the ground electrodes 1 and the insulating members 5 are fixed to the support structure 4.

Embodiment 3 will be described with reference to FIGS. 9 to 11.

Figure 9:
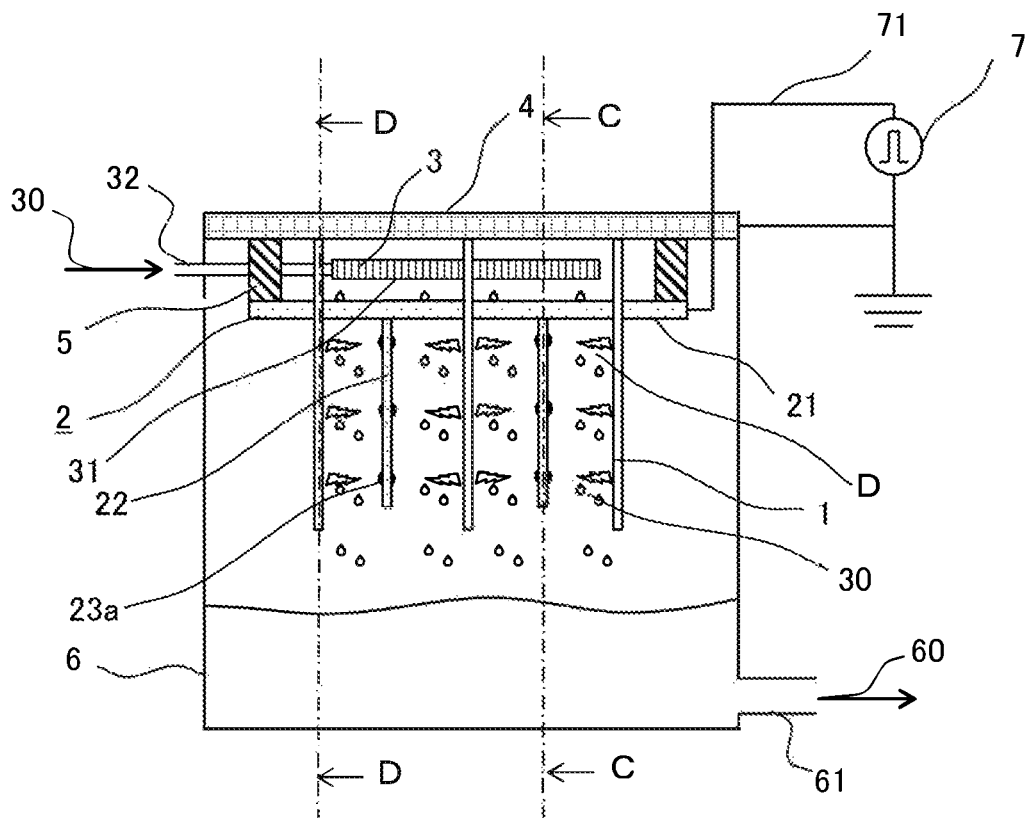
FIG. 9 is a cross-sectional view showing the configuration of a water treatment apparatus according to Embodiment 3.
Figure 10:
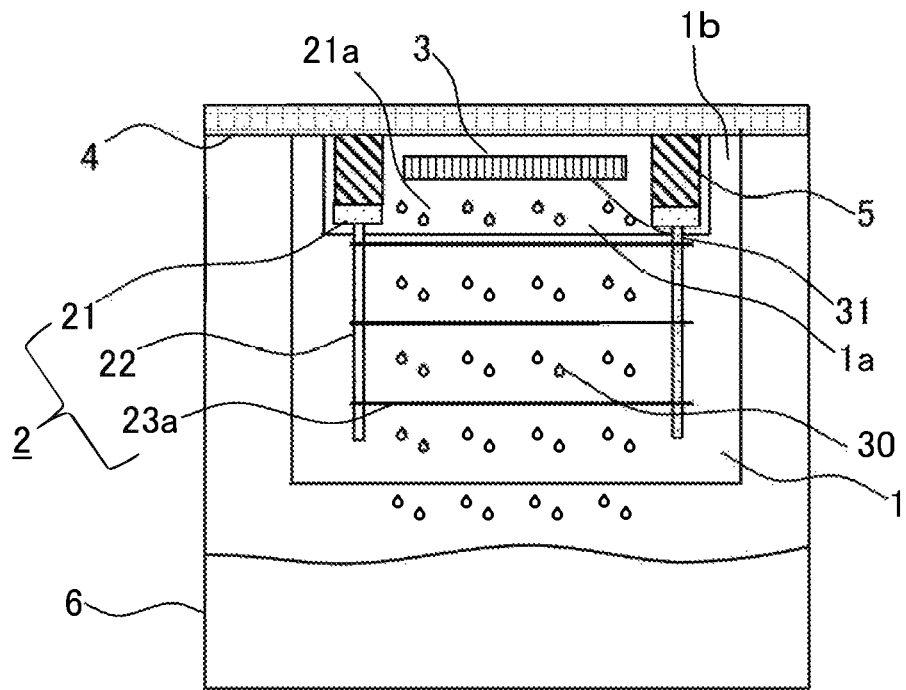
FIG. 10 is a cross-sectional view of FIG. 9 as seen in a line C-C direction.
Figure 11:
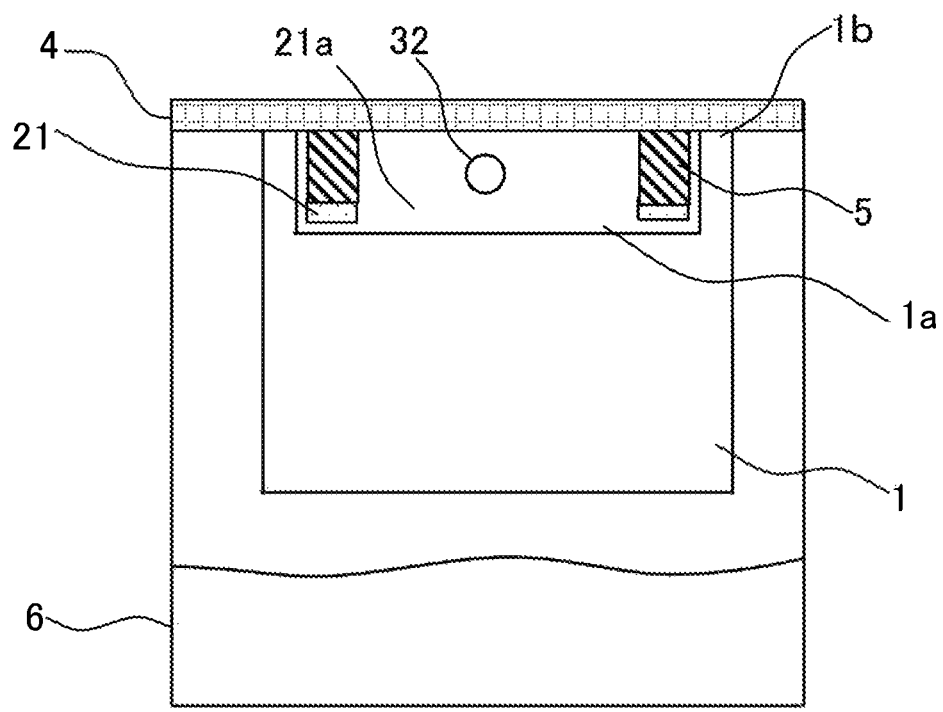
FIG. 11 is a cross-sectional view of FIG. 9 as seen in a line D-D direction.

FIG. 9 is a configuration diagram showing the configuration of a water treatment apparatus according to Embodiment 3, FIG. 10 is a cross-sectional view of FIG. 9 as seen in a line C-C direction, and FIG. 11 is a cross-sectional view of FIG. 9 as seen in a line D-D direction.

The water treatment apparatus of Embodiment 3 has the same basic configuration as that of Embodiment 1, and specifically includes ground electrodes 1, a high-voltage electrode unit 2, a water supply unit 3, a support structure 4, insulating members 5, and a treated water tank 6. Hereinafter, the differences from Embodiment 1 will be described.

The plurality of ground electrodes 1 are each a flat-plate-shaped conductive member, and are arranged at predetermined intervals in a horizontal direction so as to be parallel to each other, and the upper ends thereof in the vertical direction are fixed to the support structure 4. One ground electrode 1 has a shape having a recess-like hollow part 1a for letting the water supply unit 3, the water supply pipe 32, and the high-voltage electrode unit 2 to pass therethrough, and portions 1b, fixed to the support structure 4, at both ends of the hollow part 1a.

Each insulating member 5 is, for example, a columnar member, an upper end portion of the insulating member 5 is located above the water supply unit 3, the support structure 4 is fixed to the upper end portion of the insulating member 5, and the voltage receiving portion 21 of the high-voltage electrode unit 2 is fixed to a lower end portion of the insulating member 5.

The voltage receiving portion 21 of the high-voltage electrode unit 2 has, for example, a rectangular frame shape having an opening 21a, and the corner portions of the frame are fixed to the support structure 4 via the insulating members 5. Counter electrode portions 23a of the high-voltage electrode unit 2 that are arranged between the adjacent ground electrodes 1 and oppose the ground electrodes 1 are composed of wire-shaped electrodes, and both ends of each counter electrode portion 23a are supported by the support portions 22 of the high-voltage electrode unit 2. The drawing shows an example in which the number of wires is three, and a plurality of wires are provided at predetermined intervals in the vertical direction so as to be parallel to each other. The plurality of counter electrode portions 23a are arranged equidistantly from the adjacent ground electrodes 1. The lower ends of the support portions 22 are held so as to be located above the lower end portions, in the vertical direction, of the ground electrodes 1.

Similar to Embodiment 1, the support structure 4 is fixed to the upper portion of the treated water tank 6. However, the treated water tank 6 is deeper than in Embodiment 1, and, even when the water surface of the to-be-treated water 30 to be retained therein is taken into consideration, both the lower end portions of the ground electrodes 1 and the lower end portions of the support portions 22 of the high-voltage electrode unit 2 are held at a position higher than the water surface.

The water supply unit 3 is a sprinkling device provided above the high-voltage electrode unit 2. Sprinkling holes 31 are provided in a surface, opposing the high-voltage electrode unit 2, of the water supply unit 3, that is, in the lower surface of the water supply unit 3, and the to-be-treated water 30 is supplied from the sprinkling holes 31 to between the adjacent ground electrodes 1 located below the sprinkling holes 31. The to-be-treated water 30 supplied from the water supply unit 3 passes through the opening 21*a* of the high-voltage electrode unit 2 and between the ground electrodes 1, drops into the treated water tank 6, and is collected therein. The to-be-treated water 30 collected in the treated water tank 6 is retained in the treated water tank 6 for a certain period of time and then is drained as the treated water 60 through the drainage pipe 61. The water supply unit 3 is disposed so as to be located below the position where the ground electrodes 1 and the insulating members 5 are fixed. The support structure 4 is fixed above the ground electrodes 1 in the vertical direction.

A high voltage pulse is applied between the ground electrodes 1 and the high-voltage electrode unit 2 from the pulse power supply 7, and the electric discharge D is generated between the ground electrodes 1 and the counter electrode portions 23*a*. One terminal of the pulse power supply 7 is connected to the voltage receiving portion 21 of the high-voltage electrode unit 2 by the connection wire 71, and another terminal of the pulse power supply 7 is connected to the ground electrodes 1 via the support structure 4 and is commonly grounded. The connection wire 71 is connected to the high-voltage electrode unit 2 from above the water supply unit 3 in the vertical direction.

Next, operation of the water treatment apparatus according to Embodiment 3 will be described. The to-be-treated water 30 supplied from the outside through the water supply pipe 32 to the water supply unit 3 is supplied in the form of droplets or liquid film from the sprinkling holes 31 to between the adjacent ground electrodes 1 located below the sprinkling holes 31. At this time, the pulse power supply 7 is operated to apply a pulsed high voltage between the ground electrodes 1 and the counter electrode portions 23*a* of the high-voltage electrode unit 2, thereby generating the electric discharge D between the ground electrodes 1 and the counter electrode portions 23*a*. The electric discharge D is distributed and formed between the ground electrode 1 and the counter electrode portions 23*a* so as to form a surface in the horizontal direction. The to-be-treated water 30 comes into contact with the electric discharge D while passing between the ground electrodes 1. At this time, active species formed by the electric discharge D are dissolved in the to-be-treated water 30. As a result, water treatment such as removal of hardly-decomposable substances is performed on the to-be-treated water 30. Since the counter electrode portions 23*a* are provided in multiple stages in the vertical direction, the to-be-treated water 30 passes through the electric discharge D in multiple stages.

In order to perform high-efficiency water treatment, it is important that stable discharge can be formed without electric leak or the like in a discharge circuit. Realization of high-efficiency water treatment by the water treatment apparatus according to Embodiment 3 will be described below.

The ground electrodes 1 and the insulating members 5, which fix the high-voltage electrode unit 2, are supported by the same support structure 4. The water supply unit 3 is disposed so as to be located below the position where the support structure 4 and each insulating member 5 are fixed to each other. The position where the support structure 4 and each insulating member 5 are fixed to each other is opposite to the direction in which the to-be-treated water 30 is sprinkled, and the to-be-treated water 30 is supplied to between the ground electrodes 1 located below this position. That is, the position where the support structure 4 and each insulating member 5 are fixed to each other is a position that is not wetted with the to-be-treated water 30 from the sprinkling holes 31, so that there is no risk of electric leak due to the to-be-treated water 30.

In addition, the lower end portions of the support portions 22 of the high-voltage electrode unit 2 are held between the adjacent ground electrodes 1, and the high-voltage electrode unit 2 is insulated through the gas layer, except for the electric discharge D, below the water supply unit 3 in the vertical direction.

Therefore, even when the to-be-treated water 30 is supplied to between the ground electrodes 1 and water treatment is performed, the high-voltage electrode unit 2 is insulated below the water supply unit 3 in the vertical direction, and there is also no risk of electric leak, due to wetting with the to-be-treated water 30, at the position where the support structure 4 and each insulating member 5 are fixed to each other. That is, the high-voltage electrode unit 2 and the ground electrodes 1 form a closed circuit through the electric discharge D, and there is no electric leak part. Thus, stable electric discharge can be realized.

The connection wire 71 is connected to the high-voltage electrode unit 2 from above the water supply unit 3 in the vertical direction. Therefore, contact of the connection wire 71 with the to-be-treated water 30 is inhibited above the water supply unit 3 in the vertical direction, and thus electric leak via the connection wire 71 can also be inhibited.

Since the positional relationship between the ground electrodes 1, the insulating members 5, and the high-voltage electrode unit 2 is determined by the fixed position on the support structure 4, the intervals between the ground electrodes 1 and the counter electrode portions 23*a* of the high-voltage electrode unit 2 can be accurately maintained. In particular, in Embodiment 3, since the ground electrodes 1 and the insulating members 5 are fixed to the same upper surface, in the vertical direction, of the support structure 4, even when the support structure 4 vibrates or deforms, the intervals between the ground electrodes 1 and the counter electrode portions 23*a* of the high-voltage electrode unit 2 can be accurately maintained.

As described above, according to Embodiment 3, the same advantageous effects as Embodiment 1 are achieved. Specifically, since the ground electrodes 1 and the insulating members 5 are fixed to the support structure 4, and the high-voltage electrode unit 2 is fixed to the lower ends of the insulating members 5 fixed to the support structure 4, the intervals between the ground electrodes 1 and the high-voltage electrode unit 2 are accurately maintained, and the portion where the support structure 4 and each insulating member 5 are connected to each other can also be located above the water supply unit 3 and located in the direction opposite to the sprinkling direction. Therefore, electric leak between the ground electrodes 1 and the high-voltage electrode unit 2 is inhibited, so that it is possible to treat to-be-treated water with high efficiency by stable electric discharge.

In addition, since the counter electrode portions 23a, of the high-voltage electrode unit 2, opposing the ground electrodes 1, are provided in multiple stages in the direction in which to-be-treated water passes, and the planar electric discharge D is formed in multiple stages between the ground electrodes 1, such electric discharge contributes to high-efficiency treatment of the to-be-treated water.

In each of the embodiments, the upper end portions of the insulating members 5 are located above the water supply unit 3. In Embodiments 1 and 2, since the portion, between the ground electrodes 1 and the high-voltage electrode unit 2, where the high-voltage electrode unit 2 and each insulating member 5 are connected to each other is located above the water supply unit 3, electric leak is inhibited. In Embodiment 3, since the portion where the support structure 4 and each insulating member 5 are connected to each other is located above the water supply unit 3, electric leak is inhibited. As a result, electric leak between the ground electrodes 1 and the high-voltage electrode unit 2 in the discharge circuit is inhibited.

Figure 12:
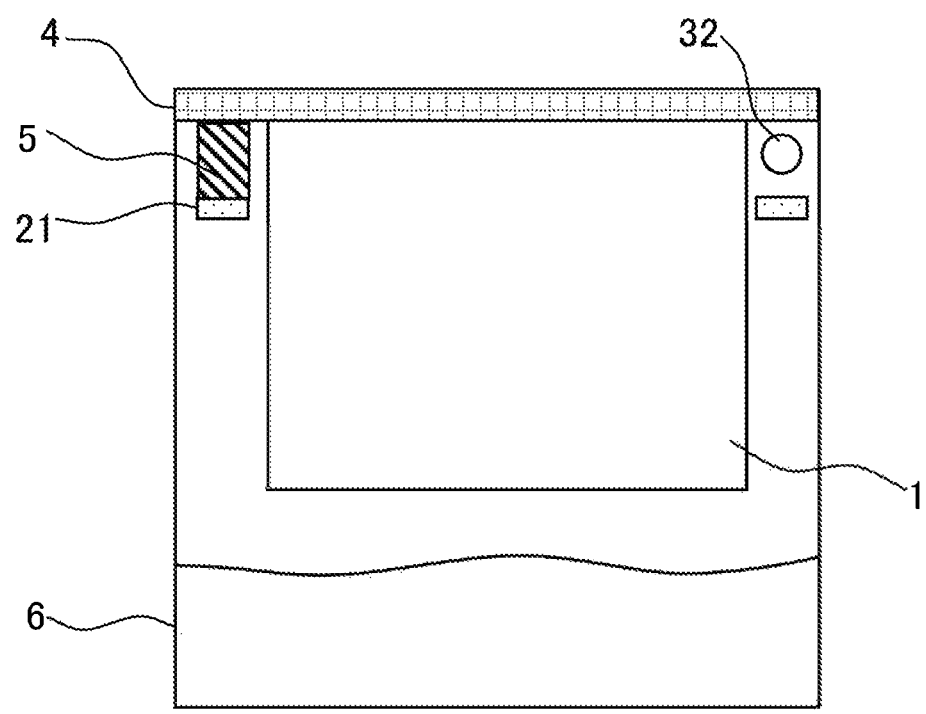
FIG. 12 is a partial cross-sectional view showing the configuration of another water treatment apparatus according to Embodiment 3.

In the above configuration, the water supply pipe 32 and the high-voltage electrode unit 2 are disposed in the recess-like hollow portions 1a of the ground electrodes 1. With such an arrangement, the size of the water treatment apparatus can be reduced. FIG. 12 shows a cross-sectional view of the same portion as in FIG. 11 in another water treatment apparatus according to Embodiment 3, and the water supply pipe 32 and the high-voltage electrode unit 2 can be made to pass at the outer periphery of the ground electrode. With such an arrangement, the ground electrode 1 at the end does not need to have the recess-like hollow portion 1a, and installation and maintenance of the water supply pipe 32 and the high-voltage electrode unit 2 can be facilitated.

In Embodiment 3 as well, similar to Embodiment 1, the shielding plate 36 may be provided to the water supply unit 3, and the water-repellent portion 52 may be provided on at least a part of each insulating member 5. Moreover, a part of each insulating member 5 may be made thin, and each insulating member 5 may be provided with an uneven shape.

Furthermore, as in Embodiment 2, the to-be-treated water 30 having passed through the electric discharge D may be circulated to improve the water treatment efficiency.

As each counter electrode portion 23a of the high-voltage electrode unit 2, a thin-plate-shaped conductive member may be used as in Embodiment 1 instead of a wire.

Although the present disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the present disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 ground electrode
1a hollow portion
1b fixed portion
2 high-voltage electrode unit
21 voltage receiving portion
21a opening
22 support portion
23, 23a counter electrode portion
3 water supply unit
30 to-be-treated water
31 sprinkling hole
32, 33 water supply pipe
34 pump
35 circulation pipe
36 shielding plate
37 valve
4 support structure
41 opening
5 insulating member
52 water-repellent portion
6 treated water tank
60 treated water
61 drainage pipe
7 pulse power supply
71 connection wire
D electric discharge

The invention claimed is:

1. A water treatment apparatus comprising:
flat-plate-shaped ground electrodes arranged at regular intervals in a horizontal direction;
a high-voltage electrode unit disposed between adjacent ground electrodes so as to oppose the ground electrodes; and
a water supply unit for supplying to-be-treated water to between the adjacent ground electrodes, wherein
treatment of the to-be-treated water is performed by electric discharge formed between the ground electrodes and the high-voltage electrode unit,
the water treatment apparatus comprises a support structure supporting the ground electrodes and supporting an insulating member connected to the high-voltage electrode unit, and
an upper end portion of the insulating member is disposed above the water supply unit.

2. The water treatment apparatus according to claim 1, wherein the water supply unit is provided between the high-voltage electrode unit and the support structure in a vertical direction.

3. The water treatment apparatus according to claim 2, wherein the ground electrodes are supported at lower end portions thereof by the support structure, and the high-voltage electrode unit is connected to the upper end portion of the insulating member.

4. The water treatment apparatus according to claim 2, wherein the ground electrodes are supported at upper end portions thereof by the support structure, and the insulating member is supported at the upper end portion thereof by the support structure.

5. The water treatment apparatus according to claim 2, wherein
the high-voltage electrode unit has counter electrode portions opposing the adjacent ground electrodes, and support portions supporting the counter electrode portions, and the support portions hold the counter electrode portions horizontally and equidistantly from the adjacent ground electrodes.

6. The water treatment apparatus according to claim 5, wherein the counter electrode portions of the high-voltage electrode unit are disposed in multiple stages in the vertical direction.

7. The water treatment apparatus according to claim 2, further comprising:
 a treated water tank for retaining the to-be-treated water treated by the electric discharge; and
 a circulation pipe for sending the to-be-treated water in the treated water tank to the water supply unit.

8. The water treatment apparatus according to claim 1, wherein the ground electrodes are supported at lower end portions thereof by the support structure, and the high-voltage electrode unit is connected to the upper end portion of the insulating member.

9. The water treatment apparatus according to claim 8, wherein
 the high-voltage electrode unit has counter electrode portions opposing the adjacent ground electrodes, and support portions supporting the counter electrode portions, and
 the support portions hold the counter electrode portions horizontally and equidistantly from the adjacent ground electrodes.

10. The water treatment apparatus according to claim 9, wherein the counter electrode portions of the high-voltage electrode unit are disposed in multiple stages in the vertical direction.

11. The water treatment apparatus according to claim 1, wherein the ground electrodes are supported at upper end portions thereof by the support structure, and the insulating member is supported at the upper end portion thereof by the support structure.

12. The water treatment apparatus according to claim 11, wherein
 the high-voltage electrode unit has counter electrode portions opposing the adjacent ground electrodes, and support portions supporting the counter electrode portions, and
 the support portions hold the counter electrode portions horizontally and equidistantly from the adjacent ground electrodes.

13. The water treatment apparatus according to claim 12, wherein the counter electrode portions of the high-voltage electrode unit are disposed in multiple stages in the vertical direction.

14. The water treatment apparatus according to claim 1, wherein the water supply unit includes a shielding plate for inhibiting scattering of the to-be-treated water.

15. The water treatment apparatus according to claim 1, wherein the insulating member includes a water-repellent portion on at least a part of a surface thereof.

16. The water treatment apparatus according to claim 1, wherein the insulating member has a cross-sectional area changing from a lower end portion thereof to the upper end portion thereof.

17. The water treatment apparatus according to claim 1, wherein
 the high-voltage electrode unit has counter electrode portions opposing the adjacent ground electrodes, and support portions supporting the counter electrode portions, and
 the support portions hold the counter electrode portions horizontally and equidistantly from the adjacent ground electrodes.

18. The water treatment apparatus according to claim 17, wherein the counter electrode portions of the high-voltage electrode unit are disposed in multiple stages in the vertical direction.

19. The water treatment apparatus according to claim 1, further comprising:
 a treated water tank for retaining the to-be-treated water treated by the electric discharge, and
 a circulation pipe for sending the to-be-treated water in the treated water tank to the water supply unit.

* * * * *